United States Patent [19]

Lobel

[11] 3,854,257

[45] Dec. 17, 1974

[54] SEALING STRUCTURE

[76] Inventor: Morris Lobel, 6501 Fern Rd., Montreal, Quebec, Canada 266

[22] Filed: Aug. 27, 1973

[21] Appl. No.: 391,096

[52] U.S. Cl. .................................. 52/173, 49/499
[51] Int. Cl. ......................... E04f 10/04, E06b 1/56
[58] Field of Search ...... 52/2, 173 DS, 173; 49/490, 49/493–499

[56] References Cited
UNITED STATES PATENTS

| | | | |
|---|---|---|---|
| 2,102,578 | 12/1937 | Gail .................................. | 49/499 X |
| 2,701,395 | 2/1955 | Barroero .......................... | 49/497 X |
| 2,731,055 | 1/1956 | Smith ............................... | 52/2 |
| 3,169,542 | 2/1965 | Neumark ......................... | 52/2 |
| 3,303,615 | 2/1967 | O'Neal ............................ | 52/173 DS |
| 3,391,503 | 7/1968 | O'Neal ............................ | 52/2 |
| 3,562,957 | 2/1971 | Landis ............................. | 49/493 |
| 3,755,968 | 9/1973 | Williams ......................... | 49/499 |

*Primary Examiner*—Alfred C. Perham
*Attorney, Agent, or Firm*—Browne, Beveridge, DeGrandi & Kline

[57]   ABSTRACT

A sealing structure to be placed around the periphery of a loading door comprises two sheets of flexible form-retaining material such as rubber. Each sheet is adapted to be bent to form in cross-section a U-shape with the open portion of the U facing the wall around the loading door, and having one arm in common with the U formed by the other sheet. A truck backing into the sealing structure deforms the rubber sheets which seal around the back of the truck.

12 Claims, 3 Drawing Figures

SEALING STRUCTURE

This invention relates to a sealing structure adapted to be placed around the edges of a loading door in a warehouse or like building.

In the loading of trucks at warehouses and the like, the truck is backed up to a loading door and a suitable gangway is placed to bridge the gap between the truck body and the warehouse floor. Merchandise is then unloaded from the truck into the warehouse or vice-versa by being moved along the gangway if there is no top or side protection for the gap between the truck and the door opening, rain or snow may enter this gap, causing discomfort to the pperson unloading the truck. Similarly, if the warehouse is heated, as in the wintertime, considerable heat may escape through the gap. If the truck and warehouse are refrigerated and the unloading is taking place in summer, considerable heat may enter.

Many door seals for positioning around the top and side edges of the loading door, in an attempt to seal this gap, are known. However, such door seals are generally expensive to construct. Many rely on filter material such as foam, which can easily be damaged. Inflated door seals are also known, but these have been found to be generally ineffective in use, due to the possibility of deflation or leakage.

It is an object of the invention to provide a door seal structure which can be placed around the top and sides of a warehouse loading door or like opening, to prevent the ingress of rain or snow and to reduce heat loss when a truck is being loaded at that door.

It is a further object to provide a door seal structure which is cheap and easy to fabricate, and which requires little maintenance during use.

Further objects and advantages of the invention will be apparent in the following description and drawings, in which.

Figure 1:
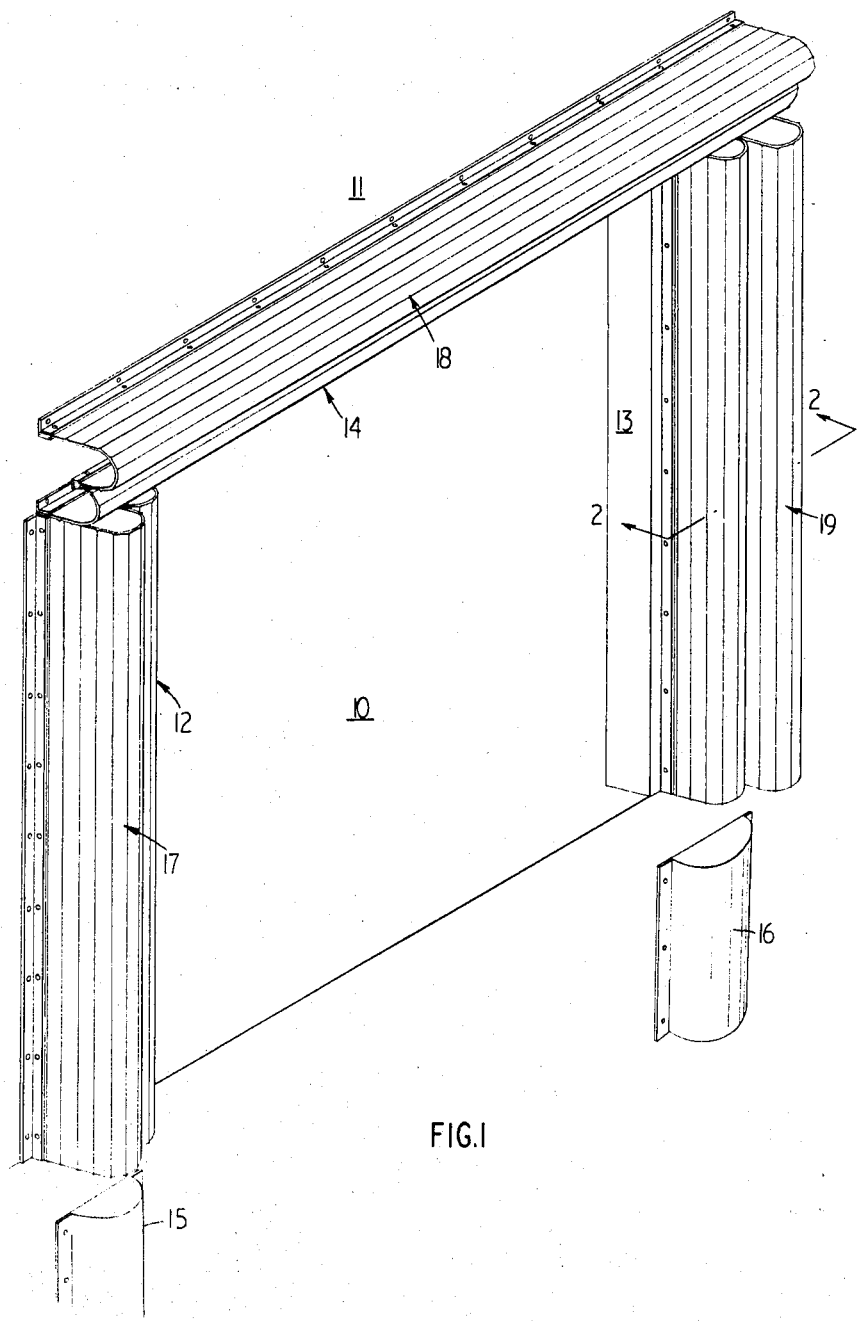
FIG. 1 is a perspective view of a door opening, with the inventive sealing structure positioned around it.

Referring to the drawings, a door opening 10 in a warehouse wall 11 is formed with sides 12 and 13 and a top 14. Suitable bumpers 15 and 16 of known design are provided at the base of the door opening, to absorb the shock of a truck backing up to the door opening.

Three novel door seals according to the present invention, are positioned as shown at 17, 18 and 19. It will be noted that, in FIG. 1, the sealing structures are positioned immediately adjacent to the two side edges and the top edge of the door. However, it is intended that the door seals will be applied in places where it is expected that the rear edge of a truck backing up to the door will approach the warehouse wall. It will be obvious that, if the door opening 10 is smaller than the back of the average size of truck expected to back up to the door opening, the sealing structures 17, 18 and 19 should be placed a slight distance away from the edges of the door opening so that these seals will contact the rear edges of the truck body.

It is contemplated that the inventive door sealing structure will be used wherever it is desired to form a seal to prevent the ingress of rain and snow, and/or to retard the transfer of heat. In FIG. 1, door seals are shown at the top and sides of the door, but it will be obvious to one skilled in the art to use an additional door seal at the bottom of the door, if this is deemed advisable in a particular installation.

Figure 2:
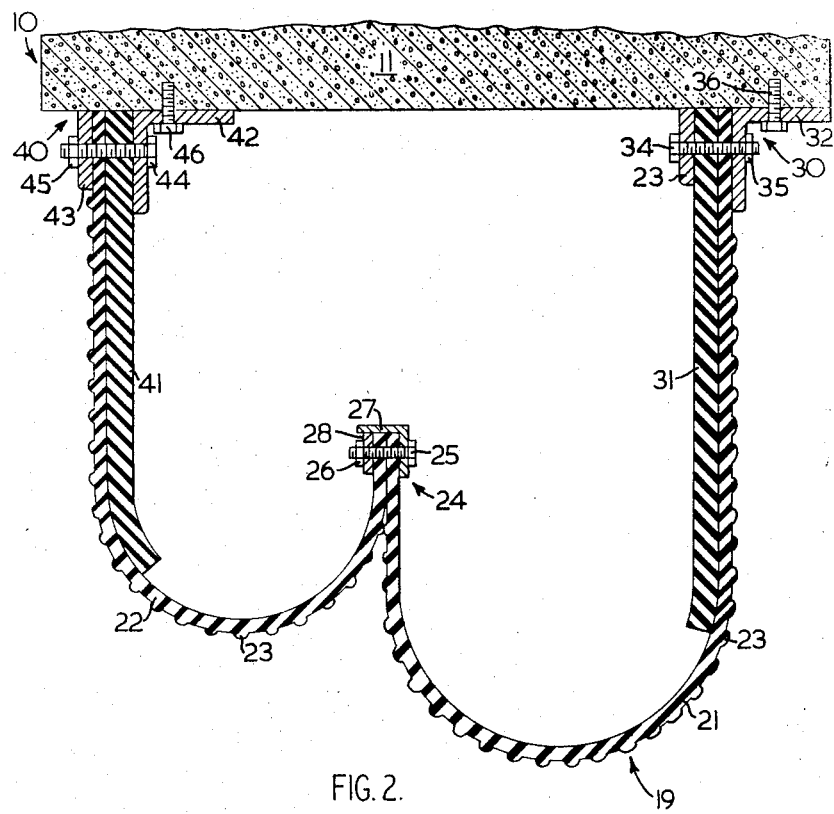
FIG. 2 is a section through FIG. 1 on the lines 2—2, on a larger scale.

Referring now to FIG. 2, a cross-section through the stucture 19 is shown. The structure is formed of two pieces of abrasion resistent rubber indicated as 21 and 22, each of which pieces is ribbed on its external side as shown at 23. The two pieces of rubber are joined adjacent a first edge of each in face to face relationship as shown at 24. In the particular construction shown, the joint is secured by longitudinally spaced bolts 25 each with an associated nut 26. Bolts 25 can be spaced along the length of member 19 as desired, with spacing of from 6 to 12 inches between bolts being preferred. For extra strength at the joint, a longitudinal angle member 27 and a flat piece 28 of mild steel are provided. These are drilled with holes for the bolts 25 to pass through. For strengthening, the angle members 27 and the flat strip 28 run the full length of the member 19.

It is understood that other methods of joining the two pieces of rubber 21 and 22 in face to face relationship adjacent the first edge of each could be used if desired, and such methods will be obvious to one skilled in the art.

Each of the pieces 21 and 22 is bent into a U-shaped form in cross-section. The U is formed so that the ribbing 23 faces outward. Each of the U-shapes has one arm (hereinafter referred to as the first arm) which joins the other rubber piece at the joint 24, and another arm (hereinafter referred to as the second arm) which is secured to the warehouse wall. The connection to the wall of member 21 is shown generally at 30 and the connection to the wall of member 22 is shown generally at 40. Stiffening members 31 and 41 are provided to stiffen the second arms of the two U-shapes. The stiffening members are preferably made of a rubber material which is flexible, but which offers considerable resistence to flexion, and tends to return to its original position. The preferable thickness of such rubber material is from ½ to 1 inch.

The connections 30 and 40 can be made in any convenient way known to the art. In the particular embodiment described, the connection 30 comprises an angle bracket 32 of mild steel on one side of the rubber piece 23. On the other side of the rubber piece 21 is stiffener 31, and beyond this is a strengthening strip of mild steel 33. The angle bracket 32, rubber piece 21 and stiffener 31, and strip 33 are all joined by spaced assemblies, each of which consists of a bolt 34 and associated nut 35. The angle bracket 32 is secured to the side of the warehouse wall 11 by masonry fastening screws 36, or any other convenient means. The connection 40 can be formed in the same way, with an angle bracket 42 (similar to bracket 32), a steel strip 43 (similar to strip 33), and spaced assemblies each consisting of a bolt 44 and nut 45 (for the same purpose as described with respect to bolt 34 and nut 35), and masonry screws 46 (similar to screws 36).

Conveniently, at least one of the angle brackets 32 of 42 is positioned outside the U-shape of its associated rubber piece, so that the masonry screws associated with the angle bracket are accessible from the exterior. This facilitates the positioning of the unit during assembly, and its dismantling if this becomes necessary. In FIG. 2, the screws 46 are inside the U-shape, but the screws 36 are outside and accessible.

It is understood that the angle brackets 32 and 42, and the strips 33 and 43 run the full length of the structure 19. Bolt and nut combinations 34, 35 and 44, 45 are spaced at intervals along the lengths. Suitable registering holes are provided through the members 21, 31, 32 and 33 for the passage of bolts 34, and suitable registering holes are provided through the members 22, 41, 42 and 43 for the passage of bolts 44. The spacing of bolts from 6 to 12 inches apart is found suitable. Similiarly, holes are provided at suitable positions for the passing of masonry holding screws 36 and 46 through the angles 32 and 42 respectively. Suitably the masonry holding screws are spaced apart a distance from 6 to 12 inches.

The rubber material of which members 21 and 22 is formed can be selected from known synthetic and natural rubbers and polymers having the desired characteristics, as will be obvious to those skilled in the art. Suitably, the rubber material will be abrasion resistant, and will be flexible but sufficiently form-maintaining so that it will not collapse unless a pressure is applied to it. A type of rubber which is found to be suitable is ribbed abrasion resistant masticated rubber with grain running across the width of the seal of ½ inch thickness. Suitably, member 21 is from 18 to 24 inches in width and member 22 is from 12 to 18 inches in width before they are bent to U-shape.

The stiffening members 31 and 41 should be flexible under pressure, but should be less flexible than the members 22 and 23. Suitably, these are from ½ to 1 inch in thickness. A suitable material for the members 31 and 41 is masticated rubber with grain running the length of the seal.

On assembling the novel door seal structure on a door, it is preferred to first make the joint 24 between the rubber pieces 21 and 22. Then bolts 34 and 44 are positioned in place and secured by nuts 35 and 45 respectively. Next, the masonry screws 46 are attached, completing the joint 40. Finally, the masonry screws 36 are attached, and the unit is ready for operation.

Figure 3:
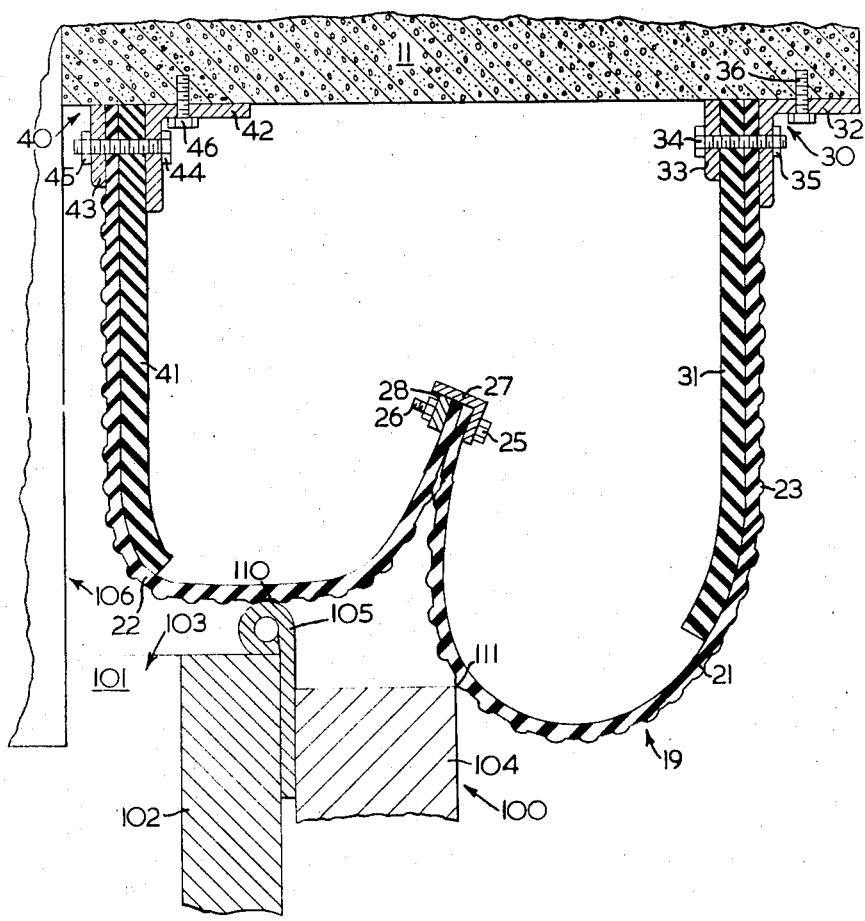
FIG. 3 is a section on the same line as FIG. 2, showing the way that the sealing structure deforms when a truck is backed into contact with it.

The operation of the novel door seals 17, 18 and 19 is indicated in FIG. 3, which is a cross-section along the lines 2—2 in which a truck has been backed up to the loading door 10. The rear portion of the truck, shown in cross-section at the same level as the lines 2—2 is indicated as 100. The truck has a cargo floor 101, a left side wall 102, a rear door opening 103, a rear door 104 shown in open position, and a door hinge 105. The truck is shown with the area between it and the door opening 10 bridged by a ramp 106.

As the truck backs into the position which is shown in FIG. 3, it contacts the piece of rubber 22, thus deforming it. The deformation causes bending of the piece of rubber 21, and the bending of the piece 21 causes the member 21 to move toward member 22, until the piece 21 also contacts a part of the truck. In FIG. 3, member 22 is shown contacting the hinge 105, which is the rearmost portion of the truck, and member 21 is shown contacting the door 104. If there were no door 104, the member 21 would continue moving toward the truck until it contacted the truck sidewall 102, if the truck backed up far enough to cause sufficient motion of piece 21.

The stiffening member 41 aids in this operation, as it causes most bending of the member 22 to take place at the arm of the U which terminates in the joint 24, called the first arm. This tends to cause the joint 24 to move, and hence to bring the member 21 into contact with the side of the truck. Similarly, the stiffening member 31 is useful, in that it tends to force the member 21 to push tightly against the truck side or door 104, by urging the member outwardly. For some operations, where the stiffness of the rubber pieces 21 and 22 alone are acceptable, the stiffening members may not be needed, but it is preferred that they be used.

It will be noted that, in the embodiment illustrated, the member 22 is less wide than member 21, with the result that the U-shape formed by member 22 is shallower than that formed by member 21. It is preferred that member 21 (i.e. the member farthest away from the door opening) be wider than member 22 (i.e., the member closest to the door opening) so that the member 21 will be able to make a seal against the side of the truck, even when the truck is not backed sufficiently into member 22 so that member is bent to any great extent. However, for some applications, it is adequate to have members 21 and 22 of the same width forming U-shapes of equal size, although this construction is not preferred.

It will be noted that the inventive door seal, when positioned so that a truck first contacts member 21, makes the sealing connection with the truck backed into it in two places. One of these places is the rearmost projection of the truck, which in FIG. 3 is indicated by the point 110 on hinge 105. The other is a point on the side of the truck or along the door, (if the doors open outwardly and fold along the side) as indicated at 111. By forming two sealing connections, the inventive sealing structure provides an improved seal against the entry of snow and rain, and reduces heat transfer. It will be appreciated that, if there was only one seal, as at 110, it would necessarily be poor in cases where there were spaced protrusions, such as hinges, on the rear edge of the sidewall of the truck. If there were such spaced protrusions and a single U-shaped member were used, an air gap would result, through snow, rain and loss of heat could occur.

If a truck which is wider than the size for which the seals are positioned backs up to the door, it is likely to back into member 21. If the two members 21 and 22 are the same width, the member 22 will then seal against the inside of the truck side wall 102, if the truck backs up far enough. If the member 22 is of lesser width than the member 21, as shown, it is unlikely that this will happen, but the member 21 contacting the rear edge of the truck body will provide a single seal. This single seal is not as efficient as the preferred double seal, but still provides some protection.

It is understood that the foregoing is a description of a preferred embodiment of the invention, but that the invention may be embodied in other specific forms without parting from the spirit or essential characteristics thereof. It is therefore intended that the scope of the invention be construed as indicated by the appended claims, and that the embodiment described is to be considered in all respects as illustrative and not restrictive.

What is claimed is:

1. A sealing structure for application to the periphery of a door or like opening which comprises: a first and a second sheet of flexible form-retaining material, each said sheet having first and second parallel longitudinal edges, said sheets being secured together substantially along said first side edges such that said sheets tend to lie together in face-to-face relationship; and means located on each said sheet adjacent the second side edge thereof for attaching said sheet to a wall or like structure.

2. A sealing structure as claimed in claim 1, in which the distance between said first and second parallel longitudinal edges of said first sheet is greater than the distance between said first and second parallel longitudinal edges of said second sheet.

3. A structure as claimed in claim 2, in which the distance between said first and second edges of said first sheet is from 12 inches to 36 inches, and the distance between the first and second edges of said second sheet is from 8 inches to 30 inches.

4. A structure as claimed in claim 1, in which said first and second sheets are formed a rubber material of from one-eighth to one-half inch in thickness.

5. A structure as claimed in claim 1, additionally comprising stiffening members arranged to stiffen each of such first and second sheets in the region of said second edge of each said sheet.

6. A structure as claimed in claim 1, in which said first and second sheets are formed of a rubber material of from one-eighth to one-half inch in thickness, and additionally comprising stiffening members arranged to stiffen each of said first and second sheets in the region of said second edge of each said sheet.

7. An elongated sealing structure for cooperating with the rear edge of a truck body to seal around a portion of a door opening in a building, said structure being positioned on the wall of the building and comprising two sheets of flexible form-retaining material, each said sheet being bent longitudinally so as to form in cross-section a U-shape having a first and second arm and the open portion of the U facing said wall, the first arm of the U-shape of one sheet and the first arm of the u-shape of the other sheet being joined together to make a double U-shape with the two U's having one arm at least partially in common and being open in the same direction and securing means positioned on the end of the second arm of each said U-shape, and securing the structure to the wall.

8. A sealing structure as claimed in claim 7, in which said second arm of one U-shape is longer than said second arm of the other U-shape, and the U-shape having the longer second arm is positioned farther from the door to be sealed than the U-shape having the shorter second arm.

9. A sealing structure as claimed in claim 8, in which the second arm of each said U-shape is longer than the first arm of said U-shape.

10. A sealing structure as claimed in claim 7, additionally comprising stiffening members arranged to stiffen each second arm of a U-shape.

11. A sealing structure as claimed in claim 7, in which said two sheets are formed of a rubber material from one-eighth to one-half inch in thickness.

12. A sealing structure as claimed in claim 9, in which said two sheets are formed of a rubber material from one-eighth to one-half inch in thickness, and additionally comprising stiffening members arranged to stiffen each second arm of a U-shape; said stiffening members being flexible but being more difficult to flex than said two sheets.

* * * * *